May 20, 1924.

C. M. WATROUS

WHEEL FOR TOYS

Original Filed June 8 1922

1,495,140

INVENTOR
Clifford M. Watrous,
BY
ATTORNEY

Patented May 20, 1924.

1,495,140

UNITED STATES PATENT OFFICE.

CLIFFORD M. WATROUS, OF EAST HAMPTON, CONNECTICUT, ASSIGNOR TO GONG BELL MANUFACTURING COMPANY, OF EAST HAMPTON, CONNECTICUT, A CORPORATION OF CONNECTICUT.

WHEEL FOR TOYS.

Original application filed June 8, 1922, Serial No. 566,901. Divided and this application filed September 24, 1923. Serial No. 664,417.

*To all whom it may concern:*

Be it known that I, CLIFFORD M. WATROUS, a citizen of the United States, and a resident of East Hampton, in the county of Middlesex and State of Connecticut, have invented certain new and useful Improvements in Wheels for Toys, of which the following is a full, clear, and exact description whereby anyone skilled in the art may make and use the same.

The invention relates to wheels for toys of various types, commonly known as rolling toys.

It relates more particularly, to the production of a wheel which, while it simulates in appearance the wheels commonly employed in motor vehicles, bicycles and other machines which employ resilient tires, may be produced upon a very economical basis and with an especially desirable degree of finish.

The main object of the invention is to provide a very inexpensive type of wheel for toys wherein various effects may be attained and especially the effect of a resilient tire which is so commonly used at the present time on automobiles and other vehicles.

A further object is to produce a toy wheel having unusual strength and durability.

One of the most expensive items in the manufacture of wheeled toys is the production of a wheel which will run evenly and smoothly. In other words, if the desired results are obtained, the wheel must be "trued" up. The present invention contemplates the production of just such a type of wheel with all of the advantages desired.

It is formed on dies from stampings and may, therefore, be manufactured in quantity with absolute uniformity and precision.

The cast type of wheel, which has been commonly employed, of necessity must be trimmed, as to its peripheral surfaces, to secure a smooth running tread, and must be centered and machined for the axle openings in order to secure proper centralizing.

The wheel hereinafter described is centered and is given a smooth peripheral surface in the blanking out and drawing up of the sheet metal, said metal being so formed in the dies that it will have increased mechanical strength when struck into the form of the finished wheel.

The wheels hereinafter described and illustrated, are somewhat similar to those disclosed in my prior application, Serial No. 566,901, entitled Wheel for toys, although the wheel of the present application has improved features not illustrated, disclosed and claimed in the prior case.

The present application is filed as a division of the above entitled application.

Referring to the drawings.

Figure 1:
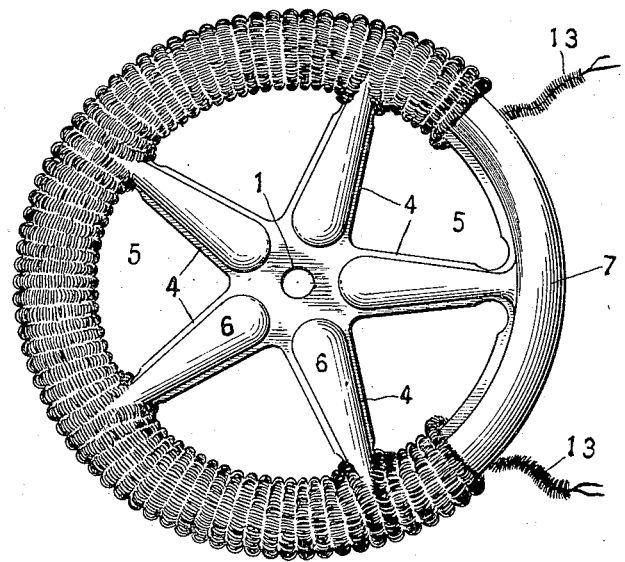
Fig. 1, illustrates in side elevation, a wheel with a portion of the resilient tire broken away.
Figure 2:
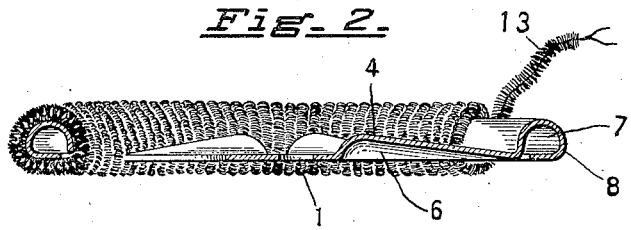
Fig. 2, is a cross sectional view on the line 2—2 of Figure 1.

In manufacturing the wheels herein described, sheet metal is employed and this sheet metal is first blanked out into a disc somewhat larger than the finished wheel. By subjection to dies the blank is centrally perforated as at 1, to provide an axle opening and the metal about the perforation may be forced out as at 3, to provide a hub.

The dies leave spoke portions 4, although the intermediate spaces 5, are punched out.

In order to reinforce the spoke portions the metal is displaced as at 6, thus giving the appearance of rotundity to the spokes and at the same time stiffening the spoke structure.

The rim or felloe portion of the wheel is of annular form produced by forming the peripheral edge of the blank into an annular-like felloe member 7.

This gives an added strength to the periphery of the wheel and provides a smooth running tread 8.

When making the annular rim or felloe of considerable size it at once has the appearance of a pneumatic or resiliently "tired" wheel.

To increase the effect of the pneumatic or other resilient tire, a band of resilient material 13, is wound about the annular-like rim, passing through the openings 5, between the spokes so that the entire outer surface of the wheel is completely covered with a resilient material. This provides what, to all purposes and intents, closely simulates a "tired" wheel.

Of course, any desired material may be used about the outer periphery but a very convenient and inexpensive material is a chenille cord. Such material is too well known to need description and obviously forms a soft tread for the wheel.

Inasmuch as the annular rim or felloe is smooth and of considerable area the covering of chenille or other material will not readily cut although it will make the wheels practically noiseless in operation and give them a grip upon the floor or other surface as the toys are moved.

There is a particular advantage in using a cord or chenille, of indefinite length, wound about the rim. First, it gives an extremely attractive appearance thereto, as it enlarges the rim portion, by simulating a comparatively large tire of resilient type. A further advantage is in the protection afforded the child. It is particularly effective when used in any desired color in conjunction with equipments of highly colored toys.

It will be quite obvious that the wheels herein described may be produced in quantity and with accuracy at a very nominal cost.

A comparatively thin sheet of metal may be employed which, when punched out and drawn up on the dies at a very nominal expense, is stiffened by the displacement of the metal for the spokes and formation of the annular rim or felloe. No finishing, centering, or machining is required as the dies furnish the article completed from the sheet metal.

Wheels being all accurately formed in dies may be assembled with facility and have all the necessary attributes of appearance and finish which the modern toy manufacturer demands.

What I claim as my invention and desire to secure by Letters Patent is:

1. A wheel for toys consisting of a disc stamped out to provide spokes, pressed out portions stiffening said spokes and a tire portion formed integral therewith by pressing the metal at the edge of the disc into an annularlike ring.

2. A wheel for toys consisting of a disc stamped out to provide spokes, pressed out portions stiffening said spokes, a tire portion formed integral therewith by pressing the metal at the edge of the disc into an annularlike ring, and a resilient material encircling and covering said annular ring.

3. A wheel for toys consisting of a disc stamped out to provide spokes, a tire portion formed integral therewith by pressing the metal at the edge of the disc into an annularlike tread, and a centrally disposed axle opening concentric with the peripheral edge.

4. A wheel for toys consisting of a disc stamped out to provide spokes, a tire portion formed integral therewith by pressing the metal at the edge of the disc into an annularlike ring, a central perforation concentric with the periphery of the wheel and a resilient covering for the annular ring.

5. A wheel for toys consisting of a disc stamped out to provide spokes, a tire portion formed by pressing the metal at the edge into an enlarged tread member and centrally disposed provision for attachment to an axle, concentric with the tread.

CLIFFORD M. WATROUS.

Witnesses:
LOUISE P. WATROUS,
HAROLD D. ALLEN.